United States Patent [19]

Larson

[11] Patent Number: 5,448,796
[45] Date of Patent: Sep. 12, 1995

[54] SPRUNG CASTOR WHEEL ASSEMBLY

[76] Inventor: Albert W. Larson, 1425 Wellington Crescent, Winnipeg, Canada

[21] Appl. No.: 138,443

[22] Filed: Oct. 20, 1993

[51] Int. Cl.⁶ .................................................. B60B 33/00
[52] U.S. Cl. .............................................................. 16/44
[58] Field of Search ................................ 16/29, 31.2, 44

[56] References Cited

U.S. PATENT DOCUMENTS

| 2,442,831 | 6/1948 | Suttles | 16/44 |
| 4,346,498 | 8/1982 | Welsch et al. | 16/44 |
| 4,462,138 | 7/1984 | Black | 16/44 |
| 4,559,669 | 12/1985 | Bonzer et al. | 16/44 |

FOREIGN PATENT DOCUMENTS

| 617428 | 11/1933 | Germany | 16/44 |
| 860352 | 2/1961 | United Kingdom | 16/44 |

*Primary Examiner*—Tom Hughes
*Assistant Examiner*—Kenneth J. Hansen
*Attorney, Agent, or Firm*—Adrian D. Battison; Murray E. Thrift; Stanley G. Ade

[57] ABSTRACT

A castor wheel assembly comprises a base member for mounting on an object to be supported, a swivel member mounted on the base member for rotation about the vertical axis. A castor wheel is mounted on a pair of side plates which extend upwardly from an axle of the castor wheel and horizontally to a cross shaft connected to the side plates. The cross shaft is mounted within a square tube forming part of the swivel member. The cross shaft carries a plurality of radially extending flanges so that elastomeric members positioned between the flanges and inside the tubular member act as a spring suspension allowing the side plates to rotate with the castor wheel relative to the swivel member about a horizontal axis providing a suspension action.

6 Claims, 4 Drawing Sheets

SPRUNG CASTOR WHEEL ASSEMBLY

BACKGROUND OF THE INVENTION

This invention relates to a sprung castor wheel assembly of the type including a base member for attachment to an object to be supported, a swivel member mounted on the base member for rotation about a vertical swivel axis, a wheel mounted on the swivel member for rotation about a horizontal axis offset to one side of the vertical swivel axis and spring suspension means between the wheel and the swivel member to allow some flexing of the wheel in a vertical direction in response to impact with uneven terrain, curbs or the like.

Sprung castor wheel assemblies of the above type are well known and are used on many different types of equipment for supporting the equipment in movement across the ground. One particular area where castor wheels of this type are used is in relation to pallet lifting dollies. Such pallet dollies include a pair of parallel lifting bars each having a ground wheel at an outer end thereof. At an inner end of the bars is provided a main support structure with a manual control unit, the main supporting structure including a main central wheel acting as drive and steering wheel in what is essentially a three wheeled unit. In order to prevent tilting of the main unit to each side there is provided a pair of castor wheels one on each side of the main drive wheel. These castor wheels are sprung so the wheel can lift slightly to accommodate uneven terrain or impact with curbs or the like. However one prior construction is relatively complex and expensive and also is prone to damage since the main side plates supporting the wheels are not sprung and if they should impact a curb, the full impact is taken within the swivel joint often causing damage.

SUMMARY OF THE INVENTION

It is one object of the present invention, therefore, to provide an improved sprung castor wheel assembly which is simple and economic to manufacture and is less prone to damage.

According to the invention, therefore, there is provided a sprung castor wheel assembly comprising a base member having a mounting surface for mounting on an object to be supported and arranged so as to define a downwardly facing base surface, a swivel member mounted on the base member at the base surface for rotation relative thereto about a vertical swivel axis, a ground engaging wheel, an axle supporting the wheel for rotation about a horizontal axis, a pair of parallel side plates each arranged at a respective side of the wheel and engaging the axle so as to support the wheel between the side plates, the wheel extending downwardly from the bottom edge of the side plate for engaging the ground, mounting means mounting the side plates on the swivel member with the side plates defining side walls of the castor wheel assembly and with the side plates extending downwardly and horizontally from the swivel member so as to support the axle at a position at a height below the swivel member and offset to one side of the vertical swivel axis, said mounting means mounting the side plates on the swivel member for pivotal movement about a horizontal axis parallel to the axle and including spring suspension means acting to resist pivotal movement on the side plates in a direction to raise the axle toward the base member.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
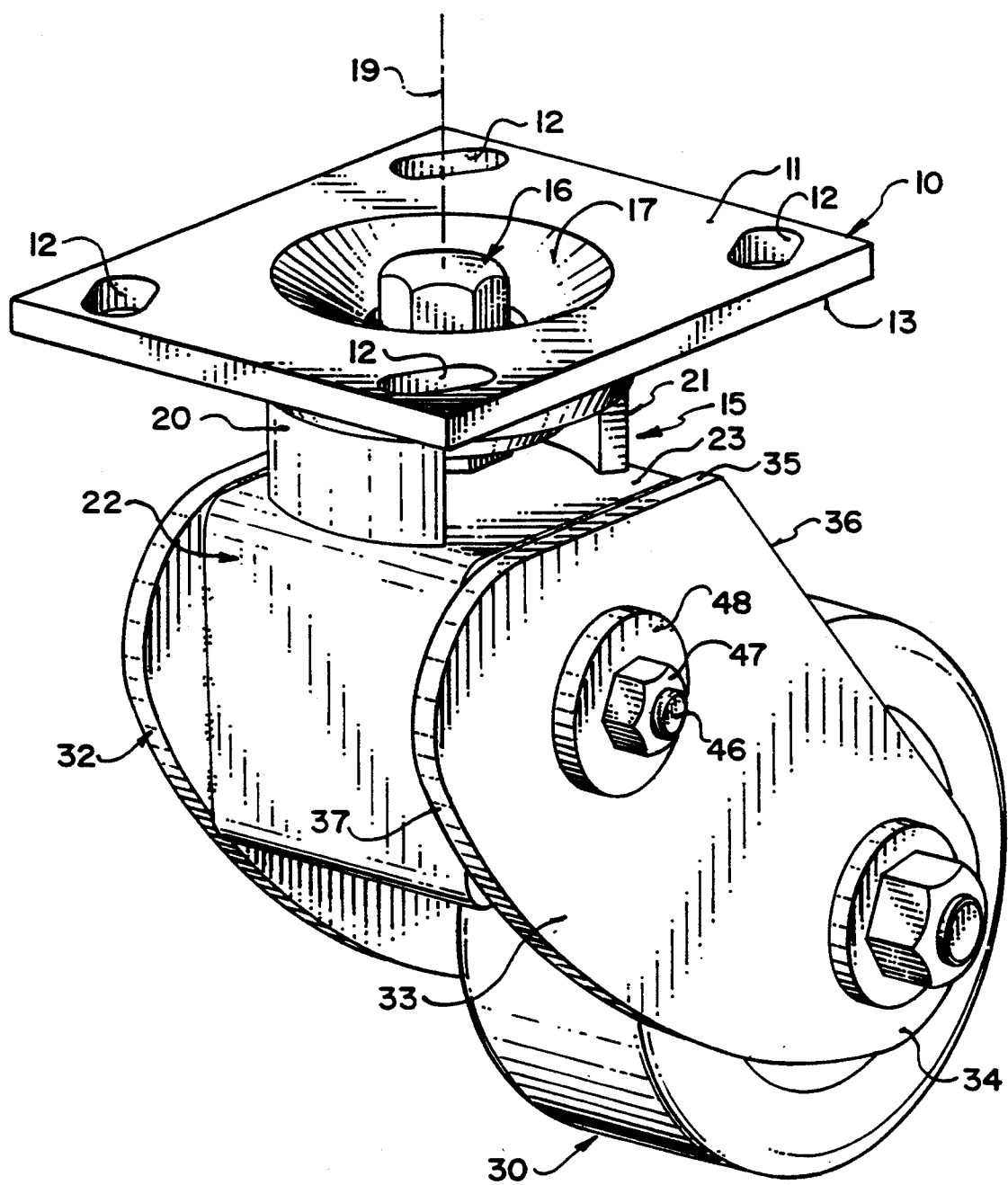
FIG. 1 is an isometric view of a sprung castor wheel assembly according to the present invention.
Figure 2:
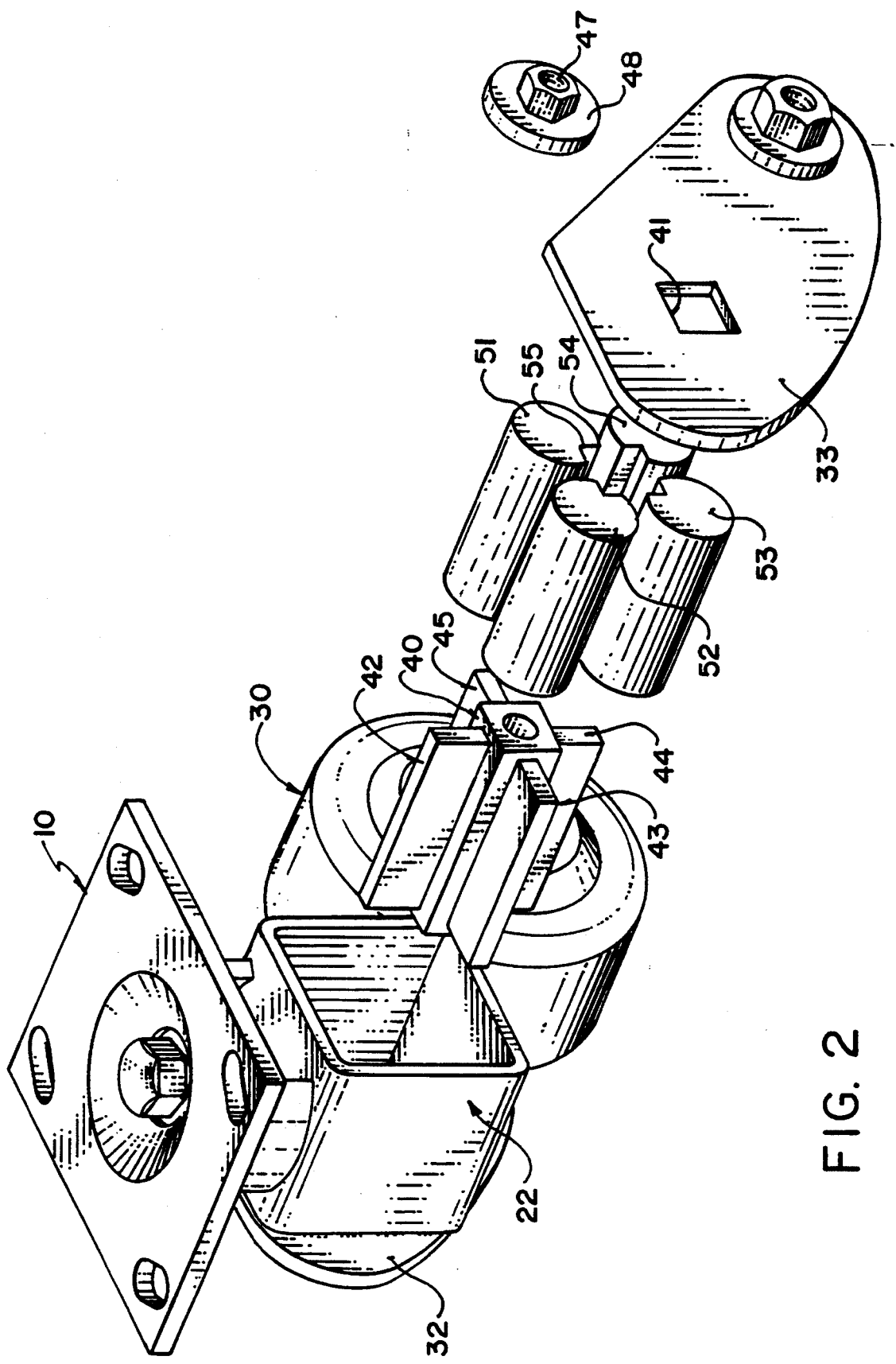
FIG. 2 is an exploded view of the castor wheel assembly of FIG. 1.

The castor wheel assembly comprises a base member 10 which includes an upper surface 11 for mounting on an undersurface of an object to be supported. The base member includes a plurality of bolt holes 12 by which the base member can be bolted to the underside of the object. The base member further includes an undersurface 13 to which is attached a swivel member 15. A swivel bearing assembly 16 is mounted in a recess 17 in the upper surface 11 of the base member and extends therefrom into a swivel boss 18 of the swivel member to allow rotation of the swivel member about a vertical axis 19 of the assembly. The details of the bearing assembly are not shown as these are well known to one skilled in the art.

On the underside of the boss 18 is provided a pair of support plates 20 and 21 which extend vertically downwardly from the boss 18 on opposed sides of the boss with the bearing assembly received between the plates 20 and 21. Attached to the bottom of the plates 20 and 21 is provided a square tubular member 22 with an axis of the tubular member indicated at 23 which lies on the vertical axis 19 and at right angles thereto. The top face of the square tubular member 22 is indicated at 23 and is welded to the bottom face of the plates 20 and 21. A bottom surface 24 of the tubular member defines the bottom edge of the swivel member. The tubular member 22, the boss 18 and the plate 20 and 21 thus form a rigid structure which is mounted for pivotal movement about the axis 19 on the base member 10.

The castor wheel assembly further includes a castor wheel 30 mounted on an axle 31. The wheel is mounted between two side plates 32 and 33. Each of the plates includes a circular hole through which the axle 31 passes at a position adjacent a bottom edge of the respective plate. The axle comprises a bolt having a washer and head engaging one of a side plates, the bolt extending through that side plate, through the wheel, through the opposed side plate and into a nut with a similar washer clamped against the outside surface of the plate. The wheel includes suitable bearings (not shown). The wheel is thus rotatable about a horizontal axis adjacent a bottom edge 34 of the respective side plate.

Figure 3:
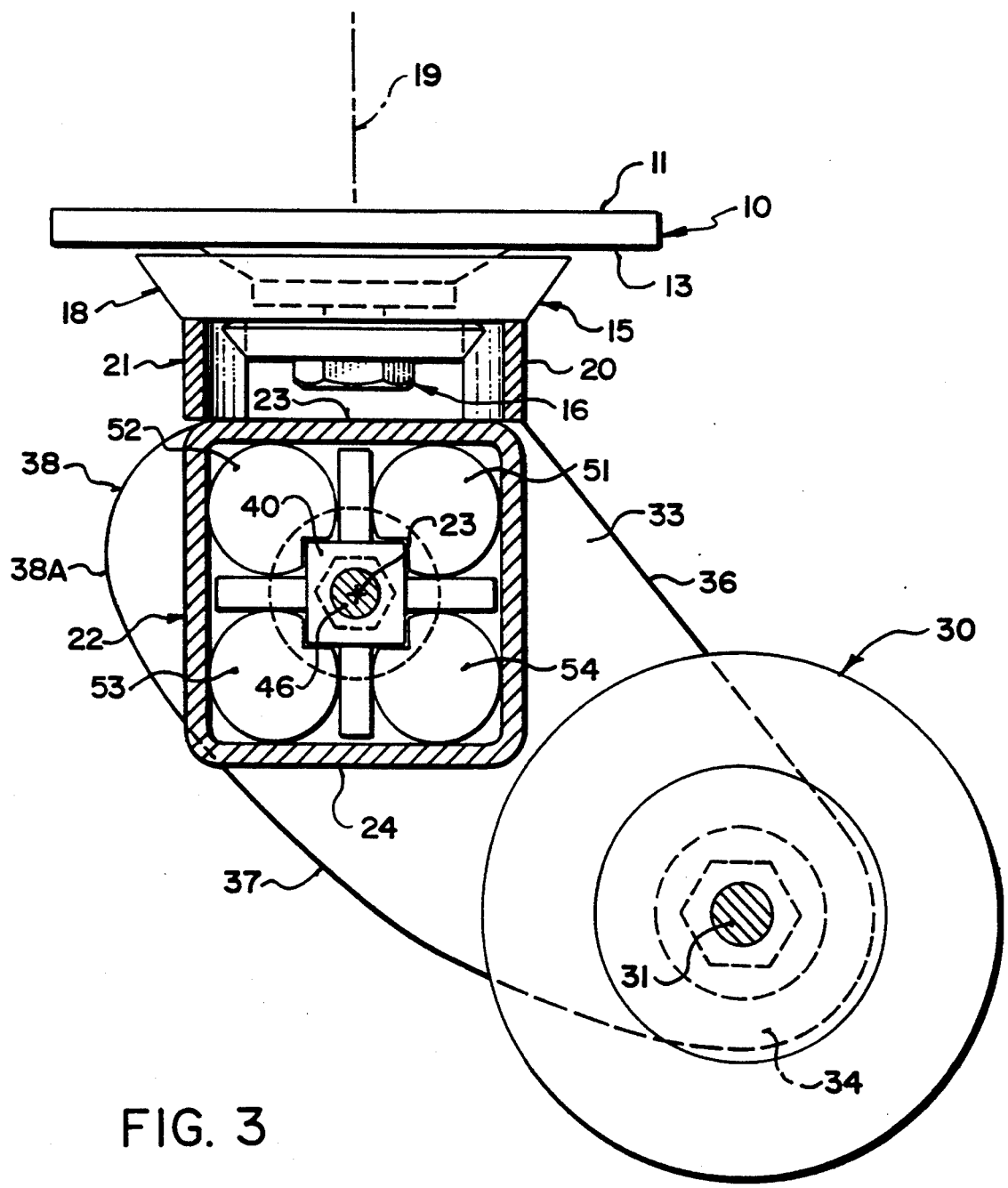
FIG. 3 is a vertical cross sectional view through the castor wheel assembly of FIG. 1.

Each side plates is shaped so that it has a top edge 35, a first side edge 36, a second side edge 37 and a bottom 34. The top edge 35 is aligned approximately with the top surface 23 of the square tubular member 22. In a normal unstressed position of the wheel and side plates, the top edge 35 is horizontal. From a top edge, the side edge 36 extends downwardly and to one side to a position outside of the axle 31. The side edge 36 is straight from the top edge 35 toward the curved bottom edge 34. The side edge 37 as best shown in FIG. 3 includes an initial outwardly curved section 38 which extends from the top edge 35 outwardly beyond a side wall of the tubular member 22 and then curves downwardly and backwardly towards the axle 31 to join with the bottom edge 34 under the axle 31. The side edge 37 is curved.

A square cross shaft 40 is mounted between the two side plates and extends through the tubular member along the axis 23. The square cross shaft has a length slightly greater than the length of the tubular member 22 so that ends of the cross shaft can engage into square holes 41 in the side plates 32 and 33. The square shaft 40 carries 4 flanges 42, 43, 44 and 45 each of which is attached to one side of the square shaft and extends along that side in a plane axial of the axis 23. The length of the flanges is slightly less than the length of the square shaft 40 and approximately equal to the length of the tubular member 23. The square shaft is thus clamped to the two side plates 32 and 33 by engaging the square ends of the square shaft into the square holes 41 and then clamping the side plates onto the square shaft by a longitudinal bolt 46 which cooperates with a nut 47. Between the nut 47 and side plate 33 is provided a washer 48 and similarly a second washer is provided between a head of the bolt 46 and the outside surface of the plate 32 on the opposed side of the castor wheel assembly (not visible).

Four elastomeric cylindrical elements 51, 52, 53 and 54 are positioned inside the tubular member between the flanges so as to take up the volume between the flanges and the inside surface of the tubular member as best shown in FIG. 3. The radial distance of the outer edge of the flange is from the axis 23 is slightly less than that of the inside surface of the tubular member so that the shaft and the flanges can rotate within the tubular member with the rotation acting to compress the elastomeric cylindrical elements while the elements act to support the shaft against vertical movement. Each of the elements 51 through 54 includes a cut-out portion 55 for receiving the periphery of the square shaft 40. The elastomeric elements are preferably of circular cross section excluding the cut out 55. In order to provide sufficient spring resistance by the elements, it is necessary to locate the elements in position under compression. This is achieved in one example by compressing the elements and freezing them in the compressed state before they are inserted into position and allowed to thaw.

Figure 4:
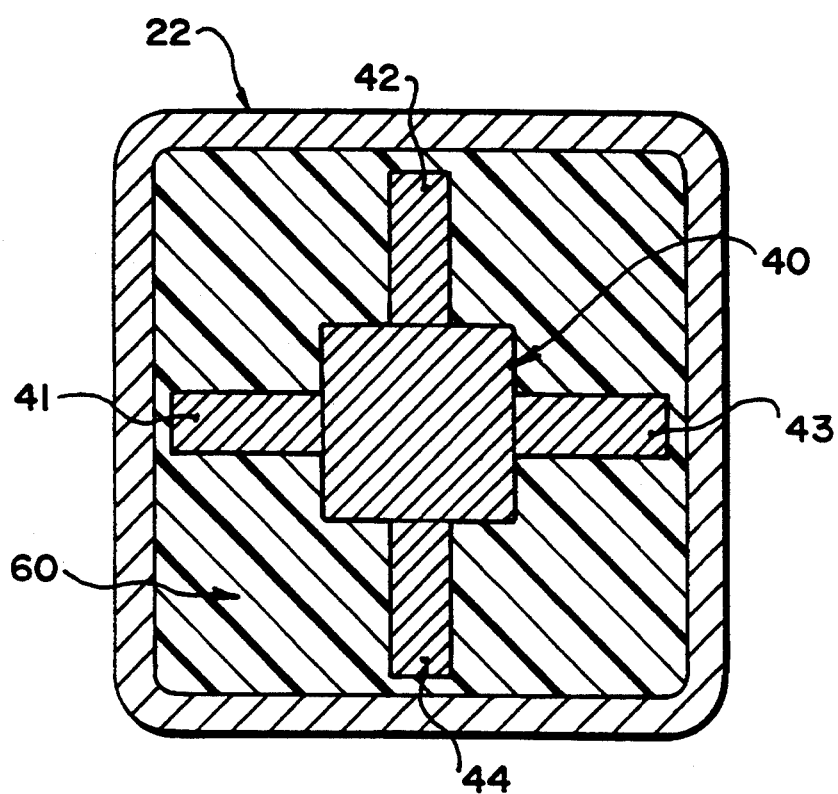
FIG. 4 is a cross sectional view similar to that of FIG. 3 showing the tubular member and shaft only in which a modified arrangement of the elastomeric material is provided.

In an alternative arrangement shown in FIG. 4, the whole of the area between the shaft 40, plates 41,42,43 and 44, and the interior of the sleeve 22 is filled with an injected rubber material 60. This injection can effected in situ and forms a single integral rubber element filling the interior of the sleeve. If it is nessary to replace the rubber element this can be done by removing the element and the shaft and the plates as a single piece and replacing them with a further molded part.

In operation, therefore, the ground wheel 30 rests upon the ground and can rotate about the axle 31. The castor assembly can also rotate about the axis 19 defined on the base member 10 in a castoring action.

Suspension is provided allowing vertical movement of the axle 31 by twisting of the shaft 40 within the tubular member 22 which causes compression of the elastomeric elements. The elastomeric elements thus act as a spring suspension resisting the upward movement but accommodating shock loads due to impact.

The axle 31 is located beneath the bottom surface 24 of the swivel member so that impact either with the wheel or with the curved surface 37 of the side plates can cause the side plates and the wheel to pivot about the axis 23 thus accommodating such shock forces from the impact. The curved surface 37 acts to accommodate impact by sliding across the object impacted for example a curb. The swivel member itself is effectively protected within the side plates so that an impact at any point beneath the forwardmost point 38A of the side plates will tend to cause pivotal movement of the side plates about the axis 23 and this accommodates such impact. It is very difficult therefore for the swivel member itself, which is unsuspended, to be impacted to cause damage to the bearing assembly 16.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A sprung castor wheel assembly comprising a base member having a mounting surface for mounting on an object to be supported and arranged so as to define a downwardly facing base surface, a swivel member mounted on the base member at the base surface for rotation relative thereto about a vertical swivel axis, a ground engaging wheel, an axle supporting the wheel for rotation about a first horizontal axis, a pair of parallel side plates each arranged at a respective side of the wheel and engaging the axle so as to support the wheel between the side plates, the wheel extending downwardly from a bottom edge of each side plate for engaging the ground, mounting means mounting the side plates on the swivel member with the side plates defining side walls of the castor wheel assembly and with the side plates extending downwardly and horizontally from the swivel member so as to support the axle at a position at a height below the swivel member and offset to one side of the vertical swivel axis, said mounting means mounting the side plates on the swivel member for pivotal movement about a second horizontal axis parallel to the axle and including spring suspension means acting to resist pivotal movement of the side plates in a direction to raise the axle toward the base member, wherein the spring suspension means includes a tubular casing of square cross-section located between the side plates and centered about said second horizontal axis and one side face thereof attached to a swivel boss, said tubular member and said swivel boss defining said swivel member, wherein the side plates are attached to a shaft passing through the tubular casing, the shaft including four radially extending flanges at 90° spacing therearound such that each flange extends along the shaft and lies substantially at a right angle to an adjacent side of the tubular casing and elastomeric means located between the shaft, the flanges thereon and an inside surface of the tubular casing for resisting rotation of the shaft relative to the tubular casing.

2. The assembly according to claim 1 wherein the swivel member has a bottom edge thereof at a height above the axle.

3. The assembly according to claim 1 wherein each of the side plates has an edge at one side thereof inclined downwardly and horizontally from a position above the second horizontal axis to a position below the axle.

4. The assembly according to claim 3 wherein each side edge is curved.

5. The assembly according to claim 1 wherein the elastomeric means is formed into a plurality of separate elastomeric elements each inserted between the inside surface of the tubular casing and the flanges.

6. The assembly according to claim 5 wherein the elastomeric elements comprise four separate cylindrical bodies each received between one flange and the next adjacent flange.

* * * * *